(12) United States Patent
Witt

(10) Patent No.: US 6,547,869 B2
(45) Date of Patent: Apr. 15, 2003

(54) PROCESS FOR PRODUCING A POWDER COATING MATERIAL; A POWDER COATING MATERIAL; AND THE USE OF EFFECT PIGMENTS

(75) Inventor: Tobias Witt, Weiterstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/907,632

(22) Filed: Jul. 19, 2001

(65) Prior Publication Data

US 2002/0022128 A1 Feb. 21, 2002

(30) Foreign Application Priority Data

Jul. 19, 2000 (DE) .......................... 100 34 972

(51) Int. Cl.$^7$ .................. C04B 14/20; C04B 14/00; C04B 14/04; C09C 1/36; C08K 5/00
(52) U.S. Cl. ................. 106/415; 106/417; 106/447; 106/479; 106/481; 106/489; 106/499; 264/141
(58) Field of Search .................. 106/415, 417, 106/447, 479, 481, 489, 499; 428/403; 264/141, 211

(56) References Cited

U.S. PATENT DOCUMENTS

| | | | |
|---|---|---|---|
| 3,711,308 A | | 1/1973 | Brand et al. |
| 3,832,208 A | | 8/1974 | Jackson |
| 3,874,890 A | | 4/1975 | Berhanrd et al. |
| 3,926,659 A | | 12/1975 | Berhnard et al. |
| 4,086,100 A | | 4/1978 | Esselborn et al. |
| 4,320,048 A | * | 3/1982 | Harmuth ............ 523/333 |
| 4,375,989 A | * | 3/1983 | Makinen ............ 106/300 |
| 4,456,486 A | | 6/1984 | Berhnard |
| 4,457,784 A | | 7/1984 | Bernhard et al. |
| 4,473,487 A | | 9/1984 | Romer et al. |
| 4,482,389 A | | 11/1984 | Franz et al. |
| 4,509,988 A | | 4/1985 | Bernhard |
| 4,537,636 A | | 8/1985 | Bernhard et al. |
| 4,544,415 A | | 10/1985 | Franz et al. |
| 4,565,581 A | | 1/1986 | Bernhard |
| 4,744,832 A | | 5/1988 | Franz et al. |
| 4,767,465 A | * | 8/1988 | Nakamura et al. ..... 106/413 M |
| 5,041,259 A | * | 8/1991 | Fujii et al. ............... 264/349 |
| 5,213,740 A | * | 5/1993 | Fuller ..................... 264/140 |
| 5,795,376 A | * | 8/1998 | Ide ........................ 106/31.73 |
| 6,103,782 A | * | 8/2000 | Mizobuchi et al. ......... 523/205 |
| 6,398,862 B1 | * | 6/2002 | Hechler et al. ............. 106/404 |

FOREIGN PATENT DOCUMENTS

| | | |
|---|---|---|
| DE | 4317019 A1 | 12/1993 |
| GB | 1359933 | 7/1974 |

OTHER PUBLICATIONS

Abstract of DE2009566.
Abstract of DE1467468.
Abstract of DE4317019.

* cited by examiner

*Primary Examiner*—Mark L. Bell
*Assistant Examiner*—Patricia L. Hailey
(74) *Attorney, Agent, or Firm*—Millen, White, Zelano & Branigan, P.C.

(57) ABSTRACT

Described is a process for preparing a powder coating material, in which a mixture comprising binders, pigments and also, where appropriate, fillers, additives and cross linkers is extruded and then ground. The pigment fraction of this mixture at least in part comprises surface-modified effect pigment that has been coated with a low molecular mass polyethylene or polypropylene. Also, described is a powder coating material prepared by this process and the use of effect pigments coated with low molecular mass polyethylene or polypropylene to prepare powder coating materials.

16 Claims, No Drawings

PROCESS FOR PRODUCING A POWDER COATING MATERIAL; A POWDER COATING MATERIAL; AND THE USE OF EFFECT PIGMENTS

The invention relates to a process for preparing a powder coating material, in which binders and pigments and also, where appropriate, fillers, additives and crosslinkers, following premixing where appropriate, are processed in the melt in an extruder to give a homogeneous mixture and the extrudate, after cooling, is ground to give the finished powder coating material.

As solvent-free and environment-friendly coating systems, powder coating materials have acquired considerable importance and are preferred over solvent-borne coating materials in numerous fields of use. They normally consist of binders, pigments, fillers and, where appropriate, additives and crosslinkers. They are in finely divided form and are generally applied electrostatically to a large number of different substrates, on which they are cured by baking or by radiative energy.

In the fluidized bed sintering process, a powder is held in suspension by air in a fluidizing tank. When heated substrates are immersed in the suspended powder, the polymer powder melts on the workpiece. When the fluid-sintering powders known to date are used to produce effect coatings, the problem may arise of separation of effect pigments and polymers in the course of the fluidizing process.

In principle, powder coating materials may be pigmented using all known pigments, including the known effect pigments, in turn including pearl lustre pigments based on mica.

Pearl lustre pigments are mica platelets coated with metal oxides, and are used in a large number of technical fields. They are available, for example, from Merck under the trade name Iriodin®. These pigments are described, for example, in German Patents and Patent Applications 14 67 468, 19 59 998, 2009 566, 22 14 545, 22 15 191, 22 44 298, 23 13 331, 25 22 572, 31 37 808, 31 37 809, 31 51 343, 31 51 356, 31 51 355, 32 11 602, 32 35 017, 33 34 598 and 35 28 256.

The powder coating materials are generally prepared by mixing the aforementioned constituents and homogenizing the mixture in extruders in the melt. The solid lumps of extruded powder coating material are passed to a mill. There, the powder coating material is ground to the particle size necessary for the application.

If platelet-shaped effect pigments are used to pigment powder coating materials, however, particular problems occur. Owing to the grinding process employed during the preparation of the powder coating material, a large proportion of the pigment platelets is destroyed, leading to a reduction in the lustre effect. It has therefore not been possible to date to mix effect pigments into the starting material for preparing the powder coating material, in the same way as other pigments, and then to grind the mixture following extrusion.

In order to prevent the destruction of the effect pigment platelets, they could be admixed to the powder coating material after grinding (dry-blend). When this is done, the disadvantage of accumulation or depletion of pigments on the surface of the object to be coated is observed. The reason for this observation is the different charging behaviour of the powder coating particles and the effect pigment particles. The problem of separation can only be solved, at least in part, by means of extremely costly processes, such as the bonding process, for example, in which uniform adhesion of the admixed pigments to the surface of the powder coating particles is achieved by means of electrostatic forces.

DE 24 34 855 describes a process for preparing powder coating materials with metallic pigmentation, in which a brushing process is used to fix the pigment platelets on the surface of the powder coating particles. The union of powder coating material and effect pigment is brought about by introducing mechanical energy and possibly thermal energy as well.

The equipment which is required in order to do this is very complex, something which is reflected in the high production costs for the lustre-pigmented powder coating materials. Additionally, the lustre of the powder coating materials thus obtained is often inadequate.

It is an object of the present invention to avoid the above-described disadvantages of the prior art and to specify a process for preparing a powder coating material which can be used to give powder coating materials in which the effect pigment particles are part of the powder coating particles. The intention is that this will avoid the above-described accumulation or depletion of pigments on the surface of the object to be coated, and that coatings having outstanding lustre will nevertheless continue to be obtained.

It has surprisingly been found that the above-described destruction of the effect pigment platelets during the grinding process does not occur if surface-modified effect pigments coated with a low molecular mass polyethylene or polypropylene are used.

Surface-modified pearl lustre pigments coated with a polymer compound are known, inter alia, from German Laid-Open Specification DE-A 43 17 019. The pigments described in this patent application include pearl lustre pigments coated with polyethylene wax. Although the patent application cited states in its introduction that surface-coated and modified pigments are used both for pigmenting varnishes, powder coating materials, paints, printing inks, plastics and the like, and in cosmetic formulations, the possibility of subjecting the coated pigments to a grinding process is not addressed. Rather, the person skilled in the art has to understand the reference to the use in powder coating materials, in the light of the state of the art at that time, to mean that the pigments must be added subsequently to the powder coating material, as was described above. It could not have been expected, indeed, that the thin coating of the effect pigment platelets with a polyethylene wax or polypropylene wax would improve the mechanical stability of the pigments to such an extent that impairment of the lustre, despite the grinding process, would not occur.

The present invention accordingly provides a process for preparing the above-described powder coating materials, in which binders and pigments and also, where appropriate, fillers, additives and crosslinkers, following premixing where appropriate, are processed in the melt in an extruder to give a homogeneous mixture and the extrudate, after cooling, is ground to the finished powder coating material, wherein at least part of the pigment fraction comprises surface-modified effect pigment that has been coated with a low molecular mass polyethylene or polypropylene.

The preparation of the powder coating materials of the invention is simple in practice and easy to operate. It corresponds to the customary preparation of powder coating materials. The binder component and the pigment component, which may comprise coated effect pigment and other standard pigments, and also fillers, additives and crosslinkers, where appropriate, are mixed thoroughly, using blade mixers or tumble mixers, for example. In the course of this process, the individual components may be admixed simultaneously or in succession to the binder component. The mixture is homogenized in the melt in an extruder and upon leaving the extruder is cooled and coarsely fractionated. In a mill, it is ground down to the final fineness of the powder coating material.

The powder coating material obtained by the process of the invention offers considerable advantages over the prior art; since there is no separation, application reliability is increased. Since there is no need for a bonding process or similar complex processes, the preparation costs are reduced. It is also possible to prepare powder coating materials which can be applied tribostatically, which was hitherto—not a possibility. Furthermore, powder coating concentrates containing effect pigments may also be prepared by the method of the invention.

The present invention additionally provides a powder coating material comprising binders, pigments and also, where appropriate, fillers, additives and crosslinkers, in which at least part of the pigment fraction comprises surface-modified effect pigment that has been coated with a low molecular mass polyethylene or polypropylene.

The effect pigment is advantageously a mica pigment coated one or more times with a metal oxide (pearl lustre pigment). The best results in terms of lustre and effect are achieved using these pigments. Other effect pigments which can be used, however, include coated $Al_2O_3$ platelets, bismuth oxychloride (BiOCl), aluminum flakes, Variocrom® or Paliocrom® pigments from BASF, LCP pigments (liquid crystal polymer pigments), coated glass flakes or multilayer pigments having from 3 to 9 layers, preferably having 3, 5 or 7 layers. Particular preference is given to pearl lustre pigments based on platelet-shaped, transparent or semi-transparent substrates. Examples of suitable substrates are phyllosilicates, such as mica, synthetic mica or other silicatic materials, glass, talc, sericite, kaolin and $SiO_2$ glass, $TiO_2$ and $Al_2O_3$ platelets. Examples of the platelet-shaped substrates are those coated with rare earth metal sulfide, such as $Ce_2S_3$ titanium suboxides, titanium oxynitrides, pseudobrookite, with colored or colorless metal oxide, such as $TiO_2$ $Fe_2O_3$, $Fe_3O_4$, $SnO_2$, $Cr_2O_3$, ZnO, CuO, NiO and other metal oxides, alone or in a mixture, in one uniform layer or in successive layers (multilayer pigments). Particular preferred pigments comprise $TiO_2$—, $Fe_2O_3$— or $TiO_2/Fe_2O_3$-coated mica, $Al_2O_3$ or $SiO_2$ platelets. Preferred multilayer pigments are mica, $SiO_2$ or $TiO_2$ substrates coated with $TiO_2$ (first layer), $SiO_2$ (second layer) and $TiO_2$ (third layer).

Effect lustre pigments also used with preference are prepared by chemical or physical deposition in the gas phase (CVD, chemical vapour deposition, or PVD, physical vapour deposition) or else are prepared by deposition in aqueous solution.

The effect pigment content is from 0.1 to 50% by weight based on the sum of all constituents. With smaller amounts, the effect is not sufficiently developed, and higher amounts likewise lead to an impairment of the effect. The effect pigment content is preferably from 0.5 to 30% by weight, with particular preference from 0.5 to 10% by weight, and with very particular preference from 1 to 7% by weight, based on the total weight of the powder coating material.

For the powder coating material of the invention it is possible to use all commercially customary powder coating materials which are commonly based on reactive epoxides, polyesters, polyacrylates or polyurethanes, and also on other polymers as well, which may be both reactive and thermoplastic. Particular preference is given to polyester powder coating materials, polyacrylate powder coating materials, polyurethane powder coating materials, epoxy powder coating materials or polyester-epoxy powder coating materials.

The effect pigment is coated advantageously with from 15 to 50% by weight, more preferably from 15 to 40% by weight, with particular preference from 15 to 35% by weight, of polyethylene or polypropylene, based on the total weight of effect pigment and polyethylene or polypropylene respectively. The coating can be affected using methods known in the art, such as by simply mixing the pigment with molten polymer.

The low molecular mass polyethylene or polypropylene used is advantageously a polyethylene or polypropylene used is advantageously a polyethylene or polypropylene having a molecular weight of from 1 000 to 20 000 daltons.

The effect pigment advantageously has a particle size of from 5 to 200 $\mu$m; where the effect pigment is a pearl lustre pigment, the latter has a particle size of from 5 to 100 $\mu$m, preferably from 10 to 60 $\mu$m.

The powder coating material of the invention may be applied to any desired substrate materials, examples being metals such as iron, steel, aluminum, copper, bronze, brass and also metal foils, and also conductive modified surfaces of glass, ceramic and concrete and the like, and also to non-conductive surfaces such as wood, e.g., furniture, glass, ceramic, plastics, inorganic building materials or other materials, for decorative and/or protective purposes.

To improve the surface quality, it is also possible for one or more clearcoats to be applied to the powder coat, the effect of such an application generally being to improve not only the appearance but also the durability of the coating as a whole. The transparent final coating is, however, not absolutely necessary.

The invention also provides for the use of surface-modified effect pigments coated with low molecular mass polyethylene or polypropylene to prepare powder coating materials comprising an extruded and ground mixture of binders and pigment and also, where appropriate, of fillers, additives and curing agents.

In the text below, the invention is illustrated with reference to an implementation example and a comparative example.

The entire disclosure of all applications, patents and publications, cited above, and of corresponding German application No. 10034972.2, filed Jul. 19, 2000, is hereby incorporated by reference.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

Five percent of Iriodin® 163 coated with low molecular mass PE are introduced together with all other required raw materials into the powder coating material production process, premixed, extruded and ground. It is then applied conventionally by electrostatic means.

COMPARATIVE EXAMPLE

Five percent of Iriodin® 163 are introduced together with all other required raw materials into the powder coating material production process, premixed, extruded and ground. It is then applied conventionally by electrostatic means.

Visual comparison of the metal sample panel coated in the example with the comparative example shows that the lustre and glitter effects of the example are good to very good whereas the specimen from the comparative example exhibits virtually no pearl lustre or glitter effect.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing a powder coating material, which comprises:

processing as a melt in an extruder, at least one binder and at least one pigment and optionally, also at least one filler, additive and/or cross linker, optionally following premixing, to give a homogeneous mixture and grinding the extrudate, after cooling, to a finished powder coating material, wherein at least part of the pigment comprises a platelet-shaped, surface-modified effect pigment that has been coated with a low molecular mass polyethylene or polypropylene.

2. The process according to claim 1, wherein the effect pigment is a mica pigment coated with iron oxide and/or titanium dioxide, coated $SiO_2$ platelet, metal oxide platelet coated one or more times, bismuth oxychloride platelet, aluminum flake, LCP pigment platelet, coated glass flake and/or multilayer pigment.

3. The process according to claim 1, wherein the effect pigment content is from 0.1 to 50% by weight based on the total weight of the powder coating material.

4. The process according to claim 1, wherein the binder is a polyester, polyacrylate, polyurethane, epoxide or polyester-epoxide.

5. The process according to claim 2, wherein the binder is a polyester, polyacrylate, polyurethane, epoxide or polyester-epoxide.

6. The process according to claim 1, wherein the effect pigment is coated with from 15 to 50% by weight of polyethylene or polypropylene based on the weight of the effect pigment.

7. The process according to claim 1, wherein the molecular weight of the polyethylene or of the polypropylene is from 1 000 to 20 000 daltons.

8. The process according to claim 6, wherein the molecular weight of the polyethylene or of the polypropylene is from 1 000 to 20 000 daltons.

9. The process according to claim 1, wherein the effect pigment has a particle size of from 5 to 200 $\mu$m.

10. A powder coating material comprising an extruded mixture, which has been ground following extrusion, of at least one binder and at least one pigment and also, optionally, at least one filler, additive and/or cross linker, wherein at least part of the pigment comprises surface-modified effect pigment that has been coated with a low molecular mass polyethylene or polypropylene.

11. The process according to claim 1, wherein the platelet-shaped, surface-modified effect pigment is a mica pigment coated one or more times with a metal oxide.

12. The process according to claim 1, wherein the platelet-shaped, surface-modified effect pigment is a $TiO_2$—, $Fe_2O_3$— or $TiO_2/Fe_2O_3$-coated mica, $Al_2O_3$ or $SiO_2$ platelet or a multilayer pigment of mica, $SiO_2$ or $TiO_2$ substrate coated with $TiO_2$, $SiO_2$ and $TiO_2$, successively.

13. The process according to claim 1, wherein the platelet-shaped, surface-modified effect pigment content is from 0.5 to 30% by weight, based on the total weight of the powder coating material.

14. The process according to claim 1, wherein the platelet-shaped, surface-modified effect pigment content is from 1 to 7% by weight, based on the total weight of the powder coating material.

15. The process according to claim 1, wherein the platelet-shaped, surface-modified effect pigment is a pearl luster pigment having a particle size of from 5 to 100 $\mu$m.

16. The process according to claim 1, wherein the platelet-shaped, surface-modified effect pigment is coated with from 15 to 35% by weight of polyethylene or polypropylene, based on the total weight of effect pigment and polyethylene or polypropylene together.

* * * * *